(12) United States Patent
Jales Costa et al.

(10) Patent No.: US 10,744,943 B1
(45) Date of Patent: Aug. 18, 2020

(54) SYSTEM AND METHOD FOR TRAILER ALIGNMENT

(71) Applicant: Ford Global Technologies, LLC, Dearborn, MI (US)

(72) Inventors: Bruno Sielly Jales Costa, Santa Clara, CA (US); Nikhil Nagraj Rao, Sunnyvale, CA (US); Vidya Nariyambut Murali, Sunnyvale, CA (US); Luke Niewiadomski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/377,388

(22) Filed: Apr. 8, 2019

(51) Int. Cl.
| | | |
|---|---|---|
| *G06K 9/00* | (2006.01) | |
| *B60R 1/00* | (2006.01) | |
| *G06T 7/70* | (2017.01) | |
| *B60D 1/36* | (2006.01) | |
| *B60D 1/06* | (2006.01) | |

(52) U.S. Cl.
CPC .............. *B60R 1/003* (2013.01); *B60D 1/065* (2013.01); *B60D 1/363* (2013.01); *G06K 9/00791* (2013.01); *G06T 7/70* (2017.01); *B60R 2300/105* (2013.01); *B60R 2300/30* (2013.01); *B60R 2300/808* (2013.01); *B60Y 2300/28* (2013.01)

(58) Field of Classification Search
CPC .............. B60R 1/003; B60R 2300/808; B60R 2300/105; B60R 2300/30; B60D 1/065; B60D 1/363; G06K 9/00791; B60Y 2300/28; G06T 7/70
See application file for complete search history.

(56) References Cited

U.S. PATENT DOCUMENTS

| | | | |
|---|---|---|---|
| 7,568,716 | B2 | 8/2009 | Dietz |
| 8,044,776 | B2 * | 10/2011 | Schofield ............ B60C 23/0408 340/425.5 |
| 8,451,107 | B2 | 5/2013 | Lu et al. |
| 9,102,271 | B2 | 8/2015 | Trombley et al. |
| 9,683,848 | B2 * | 6/2017 | Lavoie .................. B60W 30/00 |
| 9,934,572 | B2 | 4/2018 | Hu et al. |
| 10,017,115 | B2 * | 7/2018 | Lavoie .................. B60R 11/04 |
| 2005/0074143 | A1 | 4/2005 | Kawai |
| 2013/0226390 | A1 | 8/2013 | Luo et al. |
| 2014/0085472 | A1 * | 3/2014 | Lu .......................... B60R 1/002 348/148 |

(Continued)

*Primary Examiner* — Adnan Aziz
(74) *Attorney, Agent, or Firm* — Raymond Coppiellie; Price Heneveld LLP

(57) ABSTRACT

A vehicle maneuvering system comprises at least one image device configured to capture image data and a controller. The controller is configured to identify a coupler position of a trailer in the image data and control motion of the vehicle navigating a hitch ball of the vehicle toward the coupler position. The controller is further configured to monitor a coupler distance extending from the coupler position and the hitch ball. In response to the coupler distance being less than or equal to the distance threshold, the controller is configured to classify a plurality of portions of the image data as trailer portions and non-trailer portions and identify the coupler position by processing the image via a feature extraction operation.

16 Claims, 8 Drawing Sheets

(56) References Cited

U.S. PATENT DOCUMENTS

| | | | |
|---|---|---|---|
| 2014/0200759 A1* | 7/2014 | Lu .......................... | B60D 1/245 |
| | | | 701/28 |
| 2014/0224377 A1* | 8/2014 | Bonefas ............... | A01D 43/073 |
| | | | 141/1 |
| 2014/0347486 A1 | 11/2014 | Okouneva | |
| 2014/0350801 A1* | 11/2014 | Bonefas ............... | A01D 43/087 |
| | | | 701/50 |
| 2015/0002669 A1 | 1/2015 | Reed et al. | |
| 2016/0052548 A1 | 2/2016 | Singh et al. | |
| 2017/0280091 A1* | 9/2017 | Greenwood ............. | B60R 1/00 |
| 2018/0215382 A1* | 8/2018 | Gupta ................... | G08G 1/166 |
| 2018/0312022 A1* | 11/2018 | Mattern ............ | B62D 15/0285 |
| 2019/0265723 A1* | 8/2019 | Kotteri ................... | B60R 1/003 |
| 2019/0308473 A1* | 10/2019 | Yu .......................... | B60D 1/363 |
| 2019/0337344 A1* | 11/2019 | Yu ........................... | G06T 7/12 |
| 2019/0340787 A1* | 11/2019 | Ramirez Llanos ....... | B60R 1/00 |
| 2019/0375399 A1* | 12/2019 | Kasaiezadeh Mahabadi .............. | |
| | | | G06K 9/4604 |

* cited by examiner

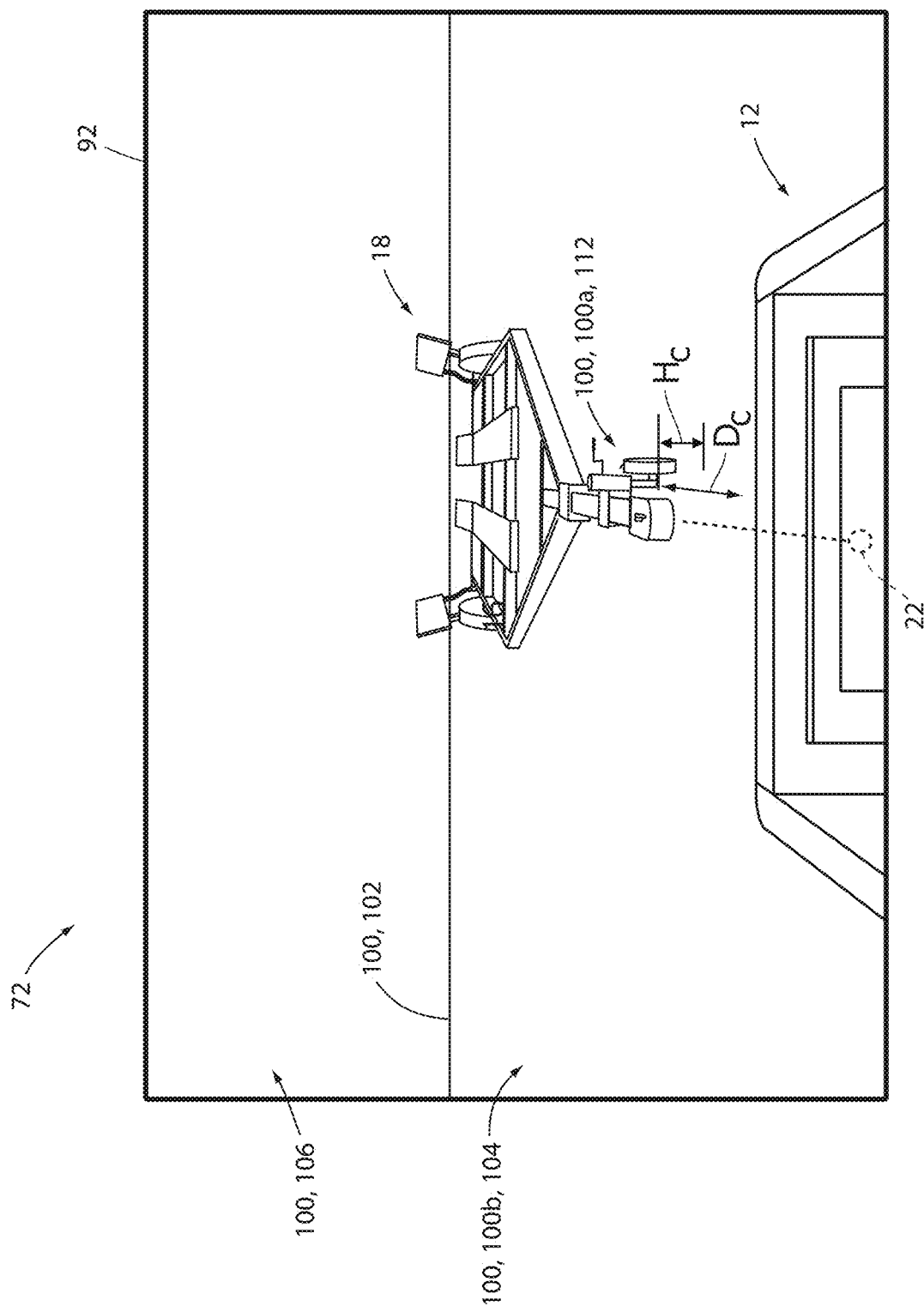

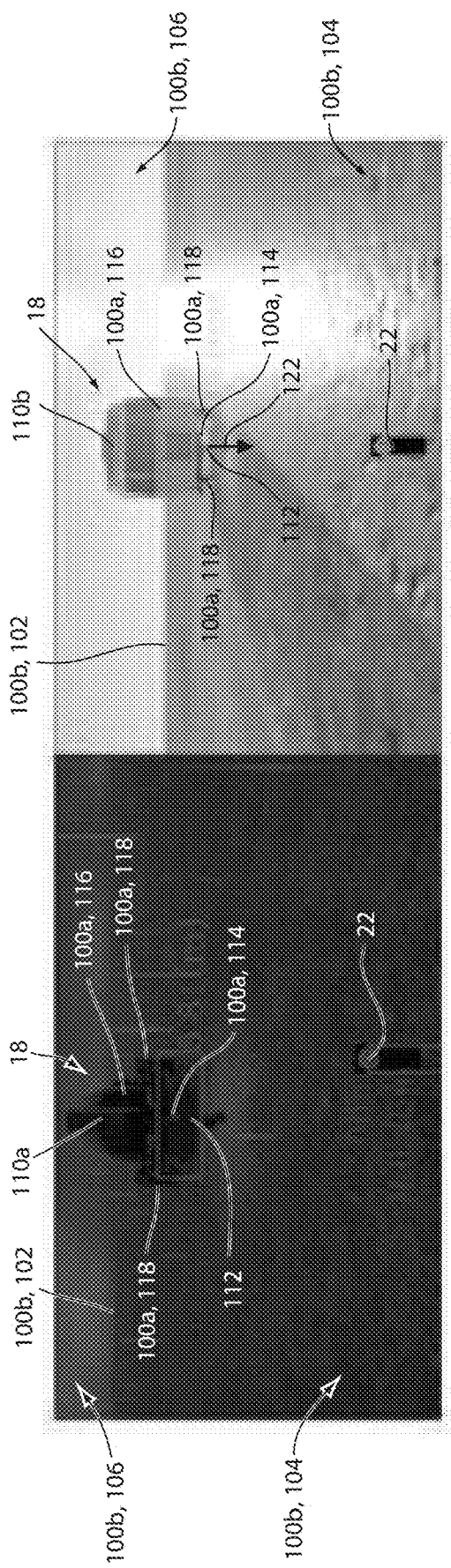
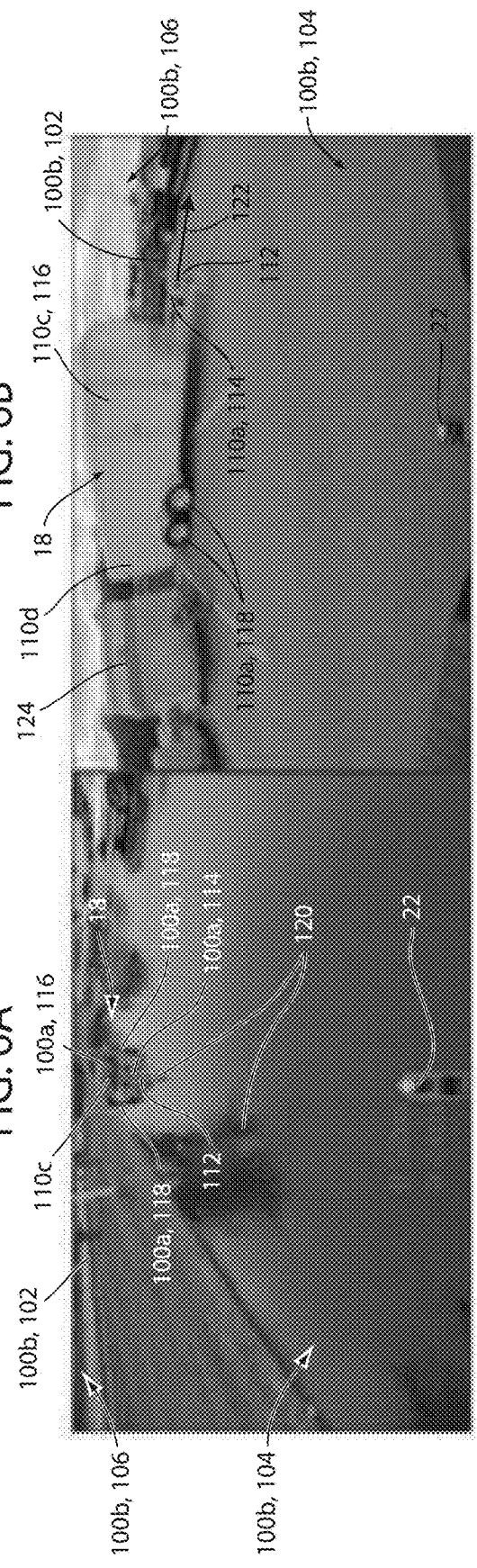
FIG. 6A
FIG. 6B
FIG. 6C
FIG. 6D

SYSTEM AND METHOD FOR TRAILER ALIGNMENT

FIELD OF THE DISCLOSURE

The present disclosure generally relates to a system for assisting in a vehicle-trailer hitching operation. In particular, the present disclosure relates to a system for controlling an alignment between a vehicle and a coupler of a trailer.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sight lines requires an inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE DISCLOSURE

According to one aspect of the present disclosure, a vehicle maneuvering control system is disclosed. The system comprises at least one image device configured to capture image data and a controller. The controller is configured to identify a coupler position of a trailer in the image data and control motion of the vehicle navigating a hitch ball of the vehicle toward the coupler position. The controller is further configured to monitor a coupler distance extending from the coupler position and the hitch ball. In response to the coupler distance being less than or equal to the distance threshold, the controller is configured to classify a plurality of portions of the image data as trailer portions and non-trailer portions and identify a trailer heading direction based on the trailer portions. The controller is further configured to identify the coupler position by processing the image via a feature extraction operation. In response to the feature extraction operation detecting the coupler position with a predetermined confidence level, the controller is configured to control the navigation of the vehicle to the coupler position identified based on the feature extraction operation.

Embodiments of the first aspect of the disclosure can include any one or a combination of the following features:
  the controller is further configured to, in response to the feature extraction operation failing to achieve the predetermined confidence level, detect the coupler position, based on the heading direction and the trailer portions nearest the vehicle;
  the coupler position is approximated when beyond the distance threshold by processing the image data via a trailer pattern processing method;
  the coupler position is detected via the feature extraction operation in the form of a Hough transform in response to the coupler position within the distance threshold;
  the controller is further configured to filter the plurality of the trailer portions of the image data to determine a plurality of nearest trailer portions based on a distance of the trailer portions from the hitch;
  the nearest trailer portions are filtered by a Kalman filter;
  the feature extraction operation processes the nearest trailer portions to identify the coupler position;
  the non-trailer portions are further classified as ground portions and object portions;
  the object portions are tracked in relation to a ground plane identified based on the ground portions;
  the trailer portions are classified as trailer tongue portions, and wherein the controller is further configured to receive motion data for the vehicle via at least one motion sensor and track the tongue portions relative to the ground plane based on the motion data; and/or
  the classification of the plurality of portions of the image data is processed by comparing pixel values in image data to identify a plurality of edges corresponding to objects.

According to another aspect of the present disclosure, a method for controlling an alignment between a hitch of a vehicle and a coupler of a trailer is disclosed. The method comprises identifying a coupler position of the coupler in image data and controlling a motion of the vehicle navigating a hitch of the vehicle toward the coupler position. The method further comprises monitoring a coupler distance between the coupler position and the hitch to a distance threshold. In response to the coupler distance being less than or equal to the distance threshold, a plurality of pixels of the image data are classified as trailer pixels and non-trailer pixels. A trailer heading direction is identified based on the trailer pixels. In response to the coupler distance being less than or equal to the distance threshold, the method further comprises identifying the coupler position of the coupler via a feature extraction operation. In response to the feature extraction operation detecting the coupler position at a predetermined confidence level, navigating to the coupler position identified based on the feature extraction operation.

Embodiments of the next aspect of the disclosure can include any one or a combination of the following features or steps:
  in response to the feature extraction operation failing to achieve the predetermined confidence level, detecting the coupler position, based on the heading direction and the trailer pixels nearest the vehicle;
  the coupler position is first approximated by processing the image data via a trailer pattern processing method;
  the coupler position is detected via the feature extraction operation in the form of a Hough transform;
  filtering the trailer pixels of the image data to determine a plurality of nearest trailer portions based on a distance of the trailer portions from the hitch in the image data;
  the nearest trailer portions are filtered by a Kalman filter; and/or
  the feature extraction operation processes the nearest trailer portions to identify the coupler position.

According to yet another aspect of the present disclosure, a control system for vehicle navigation is disclosed. The system comprises a controller in communication with at least one imaging device configured to capture image data. The controller is configured to monitor a coupler distance between a hitch of the vehicle and a first coupler distance of a coupler of a trailer. In response to the coupler distance being less than or equal to a distance threshold, the controller is configured to classify a plurality of portions of the image data as trailer portions and non-trailer portions and identify a trailer heading direction based on the trailer portions. The controller is further configured to process the image data via a Kalman filter identifying a plurality of nearest trailer portions of the trailer portions and identify the coupler position via a Hough transform when the vehicle is within the distance threshold. In response to detecting the coupler position via the Hough transform at a predetermined confidence level, the controller is configured to control a navigation to the coupler position identified via the Hough transform. In response to the feature extraction operation failing to achieve the predetermined confidence level, the controller is configured to detect the coupler position, based on the heading direction and the trailer portions nearest the vehicle. The coupler distance may be first approximated by processing the image data via a trailer pattern processing method when the vehicle is outside the predetermined coupler distance.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 5 is a is a projected view of image data demonstrating an alignment sequence with the trailer;

FIG. 6A is a sample image demonstrating exemplary image data captured by an imaging system of the vehicle demonstrating a plurality of categorized portions of a scene;

FIG. 6B is a sample image demonstrating exemplary image data captured by an imaging system of the vehicle demonstrating a plurality of categorized portions of a scene;

FIG. 6C is a sample image demonstrating exemplary image data captured by an imaging system of the vehicle demonstrating a plurality of categorized portions of a scene;

FIG. 6D is a sample image demonstrating exemplary image data captured by an imaging system of the vehicle demonstrating a plurality of categorized portions of a scene;

DETAILED DESCRIPTION OF THE PREFERRED EMBODIMENTS

Figure 1:
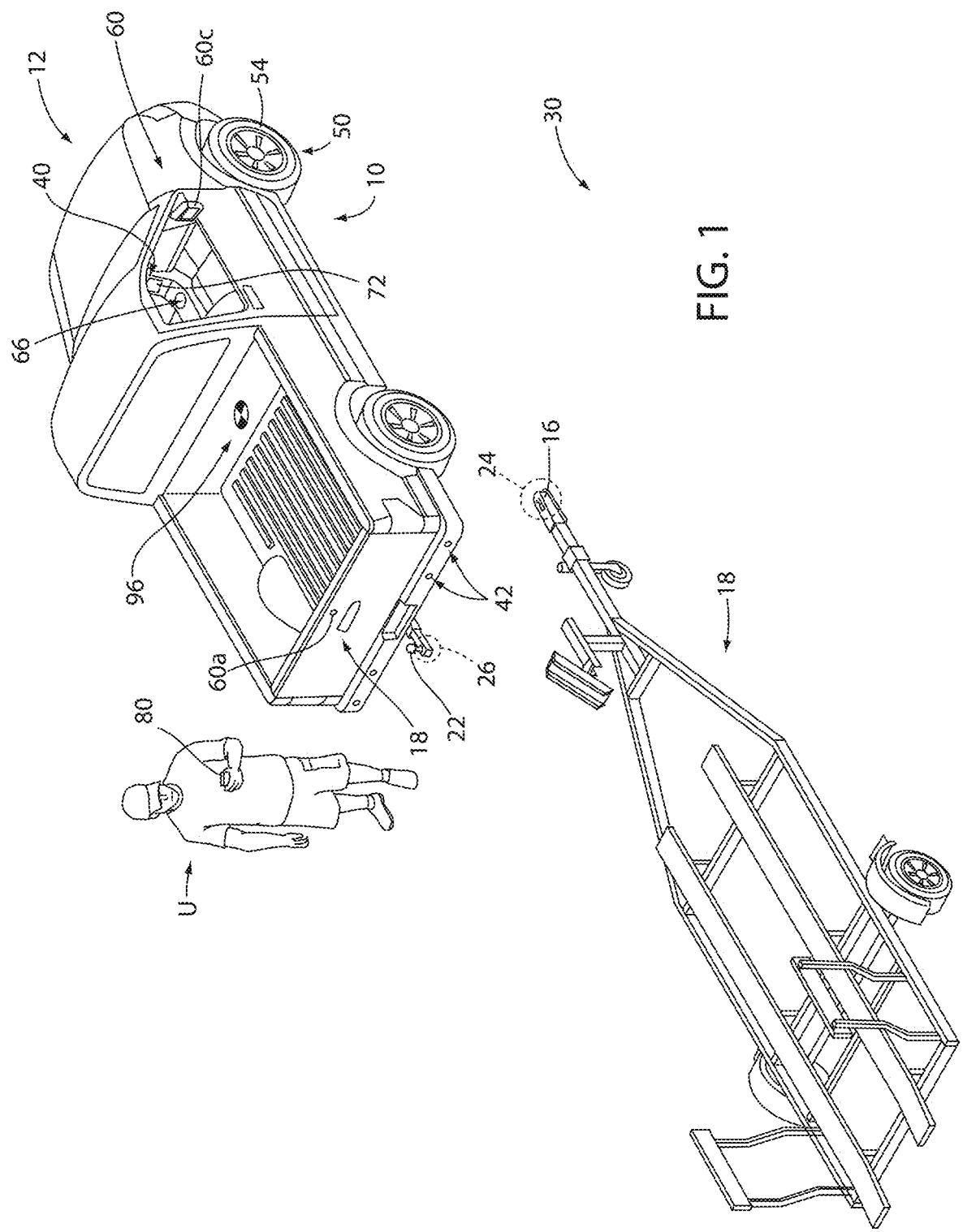
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Referring generally to FIGS. 1-4, reference numeral 10 designates a hitch assistance system (also referred to as a "hitch assist" system) for a vehicle 12. In various embodiments, hitch assist system 10 includes a controller 14 configured to acquire position data of a coupler 16 of a trailer 18. The controller 14 may be configured to derive a vehicle path 20 to align a hitch ball 22 of the vehicle 12 with the coupler 16. Deriving the vehicle path 20 may include a variety of steps including detecting and compensating for a change in a coupler position 24 in order to control the vehicle 12 to locate a hitch position 26 aligned with the coupler 16. The vehicle path 20 may comprise a plurality of segments 28, which may correspond to changes in the operating direction or steering direction of the vehicle 12. In various embodiments, deriving the vehicle path 20 may include navigating around intervening objects or structures, operating over uneven terrain, following a desired path 20 indicated by an operator or user U, etc. Accordingly, the disclosure may provide for the hitch assist system 10 to provide for improved navigation of the vehicle 12 and/or interaction with the coupler 16 such that trailer 18 may be effectively connected to the vehicle 12 without complication.

In operation, the system 10 may track a position of the trailer 18 and the coupler position 24 in image data or various sensory data captured by the vehicle 12 while maneuvering the vehicle 12 along the path 20. For successful operation, the tracking of the trailer 18 should be sufficiently accurate to ensure that the coupler position 24 remains within a maneuvering range of the vehicle 12. Such tracking of the trailer 18 and/or the coupler 16 may be accomplished by processing image data captured via an imaging system. An example of an imaging system is discussed later in reference to FIGS. 2 and 4.

In some implementations, the system 10 may be configured to process the image data or sensory data captured by the imaging system via a point tracking method. The point tracking method may be configured to track portions of the image data (e.g. edges, objects, homogeneous portions, etc.) as the vehicle 12 is maneuvered by processing a temporal sequence of image data (e.g. image frames) captured by the imaging system throughout maneuvering operations of the vehicle 12. The portions of the image data identified in the scene captured by the imaging system may be configured to process the image data to optimize the detection of the coupler 16 relative to a ground plane 30. Accordingly, the system 10 may be configured to identify the coupler position 24 of the coupler in the image data to provide a robust approximation of the location in a variety of diverse situations that may create challenges. Examples of challenging scenes and situations are further discussed in reference to FIGS. 6A-6D, and may include but are not limited to various factors, such as diverse trailer types, transient or static shadows, ground features (i.e. cracks), variations in lighting, and more. Further detailed discussion of the point tracking method is discussed in reference to FIGS. 5-8.

Figure 2:
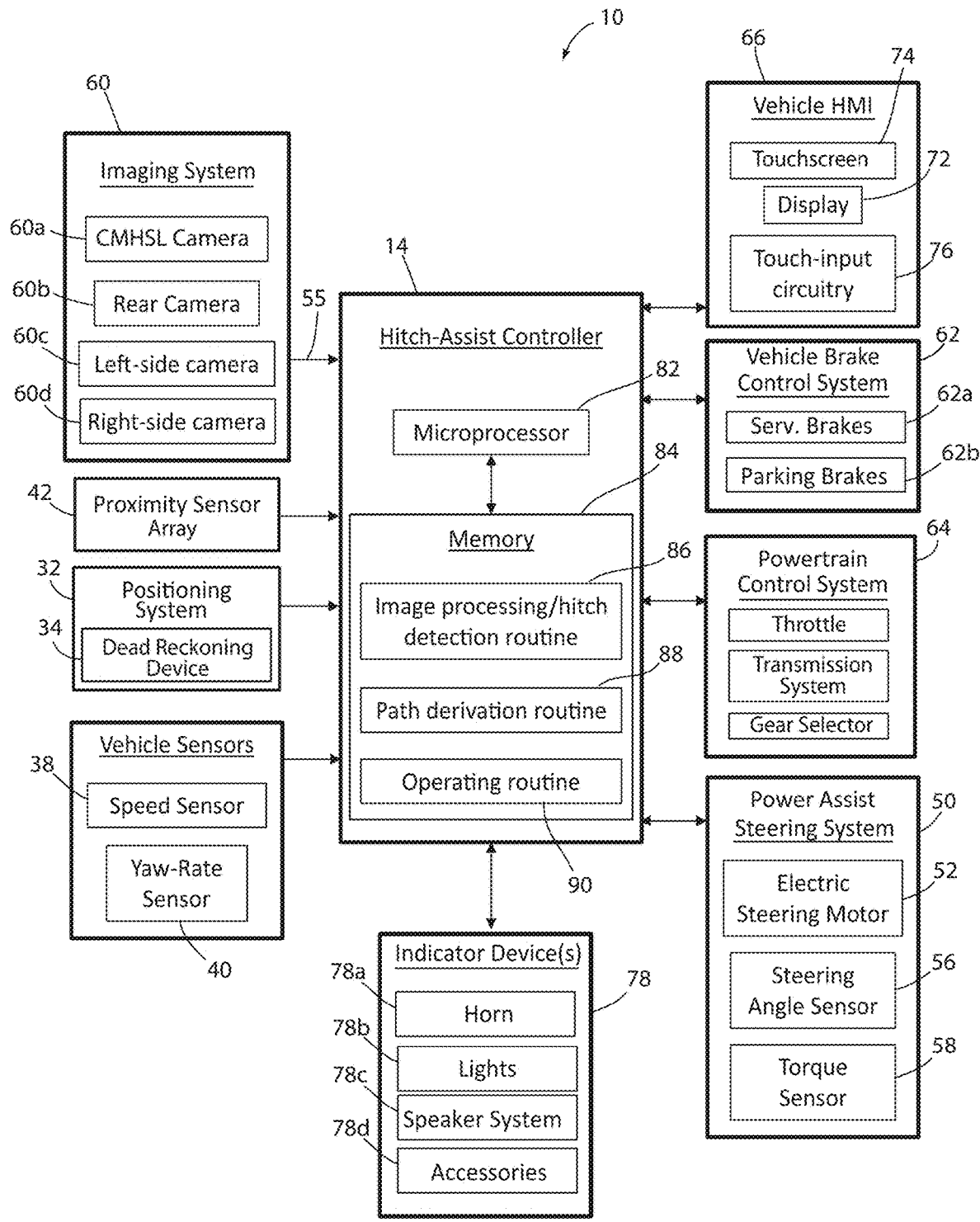
FIG. 2 is a diagram of a system according to an aspect of the disclosure for assisting in aligning the vehicle with a trailer in a position for hitching the trailer to the vehicle.
Figure 3:
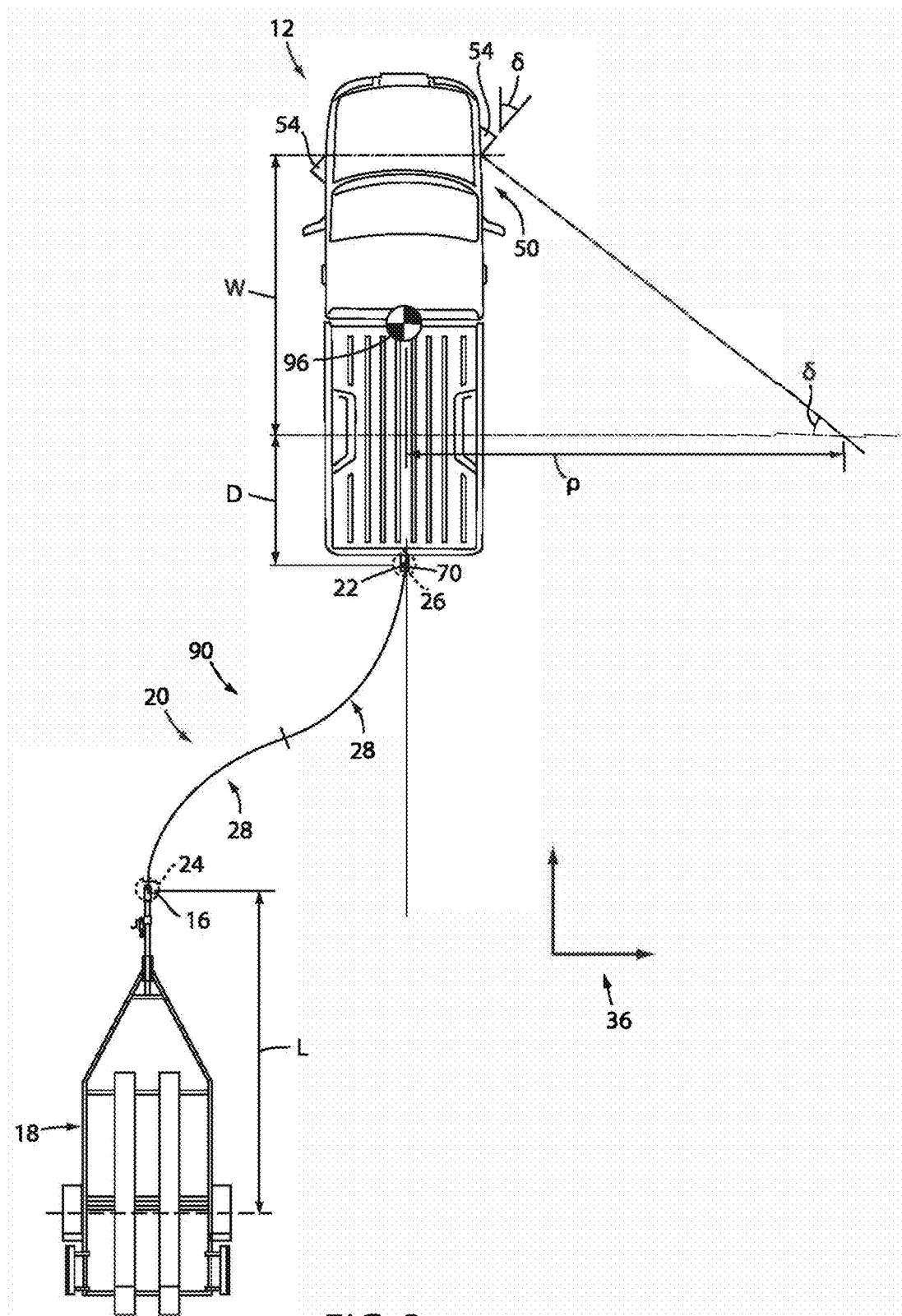
FIG. 3 is a plan view of a vehicle during a step of the alignment sequence with the trailer.
Figure 4:
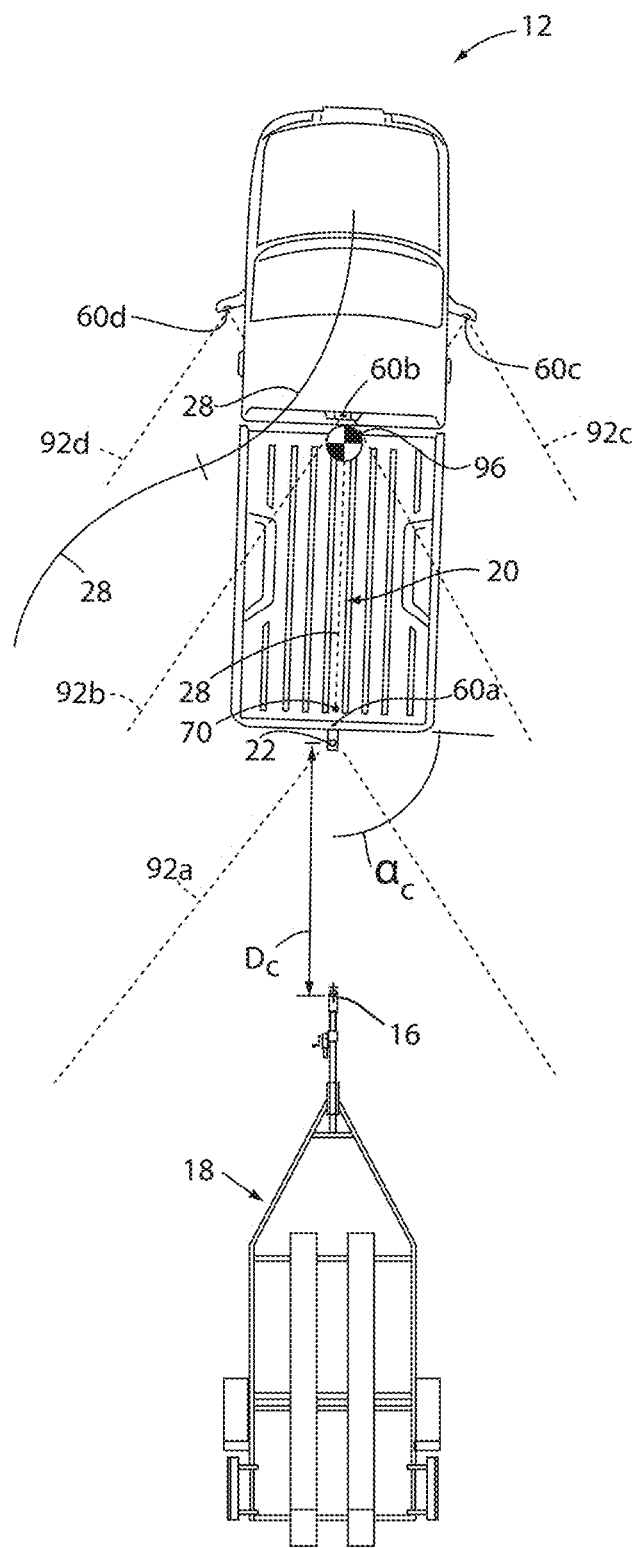
FIG. 4 is a plan view of a vehicle controlling the alignment sequence with the trailer.

With respect to the general operation of the hitch assist system 10, as illustrated in the system diagram of FIGS. 2-4, the system 10 includes various sensors and devices that obtain or otherwise provide vehicle status-related information. This information includes positioning information from a positioning system 32, which may include a dead reckoning device 34 or, in addition or as an alternative, a global positioning system (GPS), to determine a coordinate location of the vehicle 12 based on the one or more locations of the devices within the positioning system 32. In particular, the dead reckoning device 34 can establish and track the coordinate location of the vehicle 12 within a localized coordinate system 36 based at least on vehicle speed and steering angle δ as shown in FIG. 3. Other vehicle information received by hitch assist system 10 may include a speed of the vehicle 12 from a speed sensor 38 and a yaw rate of the vehicle 12 from a yaw rate sensor 40. It is contemplated that in additional embodiments, a proximity sensor 42 or an array thereof, and other vehicle sensors and devices may provide sensor signals or other information, such as sequential images of the trailer 18, including the detected coupler 16, that the controller 14 of the hitch assist system 10 may process with various routines to determine the height $H_c$ and position (e.g., based on the distance $D_c$ and angle $α_c$) of coupler 16.

As further shown in FIG. 2, one embodiment of the hitch assist system 10 is in communication with the steering system 50 of vehicle 12. The steering system 50 may be a power assist steering system 50 including a steering motor 52 to operate the steered wheels 54 (FIG. 1) of the vehicle 12 for moving the vehicle 12 in such a manner that the vehicle yaw changes with the vehicle velocity and the steering angle δ. In the illustrated embodiment, the power assist steering system 50 is an electric power-assisted steering ("EPAS") system including electric steering motor 52 for turning the steered wheels 54 to a steering angle δ based on a steering command, whereby the steering angle δ may be sensed by a steering angle sensor 56 of the power assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 of the vehicle 12, such that the steering wheel moves in concert with steered wheels 54, preventing manual intervention with the steering wheel during autonomous steering. More specifically, a torque sensor 58 is provided on the power assist steering system 50 that senses torque on the steering wheel that is not expected from autonomous control of the steering wheel and therefore indicative of manual intervention. In this configuration, the hitch assist system 10 may alert the driver to discontinue manual intervention with the steering wheel and/or discontinue autonomous steering. In alternative embodiments, some vehicles have a power assist steering system 50 that allows a steering wheel to be partially decoupled from movement of the steered wheels 54 of such a vehicle.

With continued reference to FIG. 2, the power assist steering system 50 provides the controller 14 of the hitch assist system 10 with information relating to a rotational position of steered wheels 54 of the vehicle 12, including a steering angle δ. The controller 14 in the illustrated embodiment processes the current steering angle, in addition to various vehicle 12 conditions to guide the vehicle 12 along the desired path 20 (FIG. 3). It is conceivable that the hitch assist system 10, in additional embodiments, may be an integrated component of the power assist steering system 50. For example, the power assist steering system 50 may include a hitch assist algorithm for generating vehicle steering information and commands as a function of all or a portion of information received from an imaging system 60, the power assist steering system 50, a vehicle brake control system 62, a powertrain control system 64, and other vehicle sensors and devices, as well as a human-machine interface ("HMI") 66, as discussed further below.

As also illustrated in FIG. 2, the vehicle brake control system 62 may also communicate with the controller 14 to provide the hitch assist system 10 with braking information, such as vehicle wheel speed, and to receive braking commands from the controller 14. The brake control system 62 may be configured to control service brakes 62a and a parking brake 62b. The parking brake 62b may correspond to an electronic parking brake system that may be in communication with the controller 14. Accordingly, in operation, the controller 14 may be configured to control the brakes 62a and 62b as well as detect vehicle speed information, which may be determined from individual wheel speed sensors monitored by the brake control system 62. Vehicle speed may also be determined from the powertrain control system 64, the speed sensor 38, and/or the positioning system 32, among other conceivable means. In some embodiments, individual wheel speeds can also be used to determine a vehicle yaw rate, which can be provided to the hitch assist system 10 in the alternative or in addition to the vehicle yaw rate sensor 40.

The hitch assist system 10 can further provide vehicle braking information to the brake control system 62 for allowing the hitch assist system 10 to control braking of the vehicle 12 during backing of the trailer 18. For example, the hitch assist system 10, in some embodiments, may regulate speed of the vehicle 12 during alignment of the vehicle 12 with the coupler 16 of trailer 18, which can reduce the potential for a collision with trailer 18, and can bring vehicle 12 to a complete stop at a determined endpoint 70 of the path 20. It is disclosed herein that the hitch assist system 10 can additionally or alternatively issue an alert signal corresponding to a notification of an actual, impending, and/or anticipated collision with a portion of trailer 18. The powertrain control system 64, as shown in the embodiment illustrated in FIG. 2, may also interact with the hitch assist system 10 for regulating speed and acceleration of the vehicle 12 during partial or autonomous alignment with trailer 18. As mentioned above, regulation of the speed of the vehicle 12 may be advantageous to prevent collision with trailer 18.

As previously discussed, the hitch assist system 10 may communicate with human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place or in addition to touchscreen 74. Further, the hitch assist system 10 may communicate via wireless communication with another embodiment of the HMI 66, such as with one or more handheld or portable devices 80 (FIG. 1), including one or more smartphones. The portable device 80 may also include the display 72 for displaying one or more images and other information to a user U. For instance, the portable device 80 may display one or more images of the trailer 18 on the display 72 and may be further configured to receive remote user inputs via touchscreen circuitry 76. In addition, the portable device 80 may provide feedback information, such as visual, audible, and tactile alerts.

In some embodiments, the hitch assist system 10 may further be in communication with one or more indicator devices 78. The indicator devices 78 may correspond to conventional vehicle indicators, such as a vehicle horn 78a, lights 78b, a speaker system 78c, vehicle accessories 78d, etc. In some embodiments, the indicator devices 78 may further include one or more accessories 78d, which may correspond to communication devices, remote controls, and a variety of devices that may provide for status and operational feedback between the user U and the vehicle 12. For example, in some embodiments, the HMI 66, the display 72, and the touchscreen 74 may be controlled by the controller 14 to provide status updates identifying the operation or receiving instructions or feedback to control the hitch assist system 10. Additionally, in some embodiments, the portable device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receive information from the above-described sensors and vehicle systems, including the imaging system 60, the power assist steering system 50, the vehicle brake control system 62, the powertrain control system 64, and other vehicle sensors and devices. The controller 14 may generate vehicle steering information and commands as a function of all or a portion of the information received. Thereafter, the vehicle steering information and commands may be provided to the power assist steering system 50 for affecting the steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image processing routine 86 and/or hitch detection routine, a path derivation routine 88, and an operating routine 90.

It should be appreciated that the controller 14 may be a stand-alone dedicated controller or may be a shared controller integrated with other control functions, such as integrated with a vehicle sensor system, the power assist steering system 50, and other conceivable onboard or off-board vehicle control systems. It should further be appreciated that the image processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes image processing functionality, such as that described herein, may be referred to herein as an "image processor" regardless of other functionality it may also implement (including simultaneously with executing image processing routine 86).

System 10 may also incorporate the imaging system 60 that includes one or more exterior cameras. Examples of exterior cameras are illustrated in FIG. 4 and include rear camera 60a, center high-mount stop light (CHMSL) camera 60b, and side-view cameras 60c and 60d, although other arrangements including additional or alternative cameras are possible. In one example, imaging system 60 can include rear camera 60a alone or can be configured such that system 10 utilizes only rear camera 60a in a vehicle with multiple exterior cameras. In another example, the various cameras 60a-60d included in imaging system 60 can be positioned to generally overlap in their respective fields of view, which in the depicted arrangement include fields of view 92a, 92b, 92c, and 92d to correspond with rear camera 60a, center high-mount stop light (CHMSL) camera 60b, and side-view cameras 60c and 60d, respectively. In this manner, image data from two or more of the cameras can be combined in image processing routine 86, or in another dedicated image processor within imaging system 60, into a single image.

As an example of combining image data from multiple cameras, the image data can be used to derive stereoscopic image data that can be used to reconstruct a three-dimensional scene of the area or areas within overlapped areas of the various fields of view 92a, 92b, 92c, and 92d, including any objects (obstacles or coupler 16, for example) therein. In an embodiment, the use of two images including the same object can be used to determine a location of the object relative to the two image sources, given a known spatial relationship between the image sources. In this respect, the image processing routine 86 can use known programming and/or functionality to identify an object within image data from the various cameras 60a, 60b, 60c, and 60d within imaging system 60. In either example, the image processing routine 86 can include information related to the positioning of any cameras 60a, 60b, 60c, and 60d present on vehicle 12 or utilized by system 10, including relative to a center 96 (FIG. 1) of vehicle 12, for example, such that the positions of cameras 60a, 60b, 60c, and 60d relative to center 96 and/or to each other can be used for object positioning calculations and to result in object position data relative to the center 96 of vehicle 12, for example, or other features of vehicle 12, such as hitch ball 22 (FIG. 1), with known positions relative to center 96 of the vehicle 12.

The image processing routine 86 can be specifically programmed or otherwise configured to locate coupler 16 within image data. In one example, the image processing routine 86 can identify the coupler 16 within the image data based on stored or otherwise known visual characteristics of coupler 16 or hitches in general. In another embodiment, a marker in the form of a sticker, or the like, may be affixed with trailer 18 in a specified position relative to coupler 16 in a manner similar to that which is described in commonly-assigned U.S. Pat. No. 9,102,271, the entire disclosure of which is incorporated by reference herein. In such an embodiment, the image processing routine 86 may be programmed with identifying characteristics of the marker for location in image data, as well as the positioning of coupler 16 relative to such a marker so that the position 24 of the coupler 16 can be determined based on the marker location.

Additionally or alternatively, controller 14 may seek confirmation of the determined coupler 16, via a prompt on touchscreen 74. If the coupler 16 determination is not confirmed, further image processing may be provided, or user-adjustment of the position 24 of coupler 16 may be facilitated, either using touchscreen 74 or another input to allow the user U to move the depicted position 24 of coupler 16 on touchscreen 74, which controller 14 uses to adjust the determination of position 24 of coupler 16 with respect to vehicle 12 based on the above-described use of image data. Alternatively, the user U can visually determine the position 24 of coupler 16 within an image presented on HMI 66 and can provide a touch input in a manner similar to that which is described in commonly-assigned U.S. Pat. No. 10,266,023, the entire disclosure of which is incorporated by reference herein. The image processing routine 86 can then correlate the location of the touch input with the coordinate system 36 applied to image data shown on the display 72, which may be depicted as shown in FIG. 3.

As shown in FIG. 3, the image processing routine 86 and operating routine 90 may be used in conjunction with each other to determine the path 20 along which hitch assist system 10 can guide vehicle 12 to align hitch ball 22 and coupler 16 of trailer 18. In the example shown, an initial position of vehicle 12 relative to trailer 18 may be such that coupler 16 is only in the field of view 92c of side camera 60c, with vehicle 12 being positioned laterally from trailer 18 but with coupler 16 being almost longitudinally aligned with hitch ball 22. In this manner, upon initiation of hitch assist system 10, such as by user input on touchscreen 74, for example, image processing routine 86 can identify coupler 16 within the image data of camera 60c and estimate the position 24 of coupler 16 relative to hitch ball 22. The position 24 of the coupler 16 may be identified by the system 10 using the image data in accordance by receiving focal length information within image data to determine a distance $D_c$ to coupler 16 and an angle $\alpha_c$ of offset between coupler 16 and the longitudinal axis of vehicle 12. This information may also be used in light of the position 24 of coupler 16 within the field of view 92 of the image data to determine or estimate the height $H_c$ of coupler 16. Once the positioning $D_c$, $\alpha_c$ of coupler 16 has been determined and, optionally, confirmed by the user U, the controller 14 can take control of at least the vehicle steering system 50 to control the movement of vehicle 12 along the desired path 20 to align the hitch ball position 26 of the vehicle hitch ball 22 with coupler 16.

Continuing with reference to FIGS. 3 and 4 with additional reference to FIG. 2, controller 14, having estimated the positioning $D_c$, $\alpha_c$ of coupler 16, as discussed above, can, in one example, execute path derivation routine 88 to determine vehicle path 20 to align the vehicle hitch ball 22 with coupler 16. In particular, controller 14 can have stored in memory 84 various characteristics of vehicle 12, including the wheelbase W, the distance from the rear axle to the hitch ball 22, which is referred to herein as the drawbar length L, as well as the maximum angle to which the steered wheels 54 can be turned $\delta_{max}$. As shown, the wheelbase W and the current steering angle $\delta$ can be used to determine a corresponding turning radius $\rho$ for vehicle 12 according to the equation:

$$\rho = \frac{1}{W \tan \delta} \quad (1)$$

in which the wheelbase W is fixed and the steering angle $\delta$ can be controlled by controller 14 by communication with the steering system 50, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}} \quad (2)$$

Path derivation routine 88 can be programmed to derive vehicle path 20 to align a known location of the vehicle hitch ball 22 with the estimated position 24 of coupler 16 that takes into account the determined minimum turning radius $\rho_{min}$ to allow path 20 to use the minimum amount of space and maneuvers. In this manner, path derivation routine 88 can use the position of vehicle 12, which can be based on the center 96 of vehicle 12, a location along the rear axle, the location of the dead reckoning device 34, or another known location on the coordinate system 36, to determine both a lateral distance to the coupler 16 and a forward or rearward distance to coupler 16 and derive a path 20 that achieves the needed lateral and forward-backward movement of vehicle 12 within the limitations of steering system 50. The derivation of path 20 further takes into account the positioning of hitch ball 22, based on length L, relative to the tracked location of vehicle 12 (which may correspond with the center 96 of mass of vehicle 12, the location of a GPS receiver, or another specified, known area) to determine the needed positioning of vehicle 12 to align hitch ball 22 with coupler 16.

As discussed above, hitch assist system 10 can provide image data to image processing routine 86 that can be used by image processing routine 86 (by the process described above or by other available processes) to determine the height $H_b$ of hitch ball 22 (i.e., a vertical component of the data including the position 24 of coupler 16. The image data may be captured by one or more of the cameras 60a-d of the imaging system 60. Further, hitch assist system 10 can have stored in memory 84 or can otherwise determine the height $H_b$ of hitch ball 22. In one example, during an initial setup routine for hitch assist system 10, a user U can be prompted to install hitch ball 22 by way of assembling a ball mount including hitch ball 22 with a receiver positioned on the rear of vehicle 12. The user U can then be asked to measure the height $H_b$ of the hitch ball 22 (such as to the top or center thereof) and to enter that measurement into memory 84 by way of HMI 66, for example. In this manner, a number of different height measurements for a plurality of hitch balls used in connection with the particular vehicle 12 can be stored in memory 84 and can be selected by the user U. In some embodiments, hitch ball 22 may be within the field of view 92a of rear camera 60a such that image data can be processed to determine the height $H_b$ of hitch ball 22 on a real-time or on-demand basis.

Referring to FIG. 5, as previously discussed, the hitch system 10 may be configured to control or guide the user U through monitor the trailer 18 and the coupler position 24 in the image data or various sensory data captured by the vehicle 12. As the controller 14 maneuvers the vehicle 12 along the path 20, the coupler position 24 and the trailer 18 may be monitored as identified portions of the image data via a point or image portion tracking method. The point tracking method may be configured to track portions of the image data (e.g. edges, objects, homogeneous portions, etc.) as the vehicle 12 is maneuvered by processing a temporal sequence of image data (e.g. image frames) captured by the imaging system 60 throughout maneuvering operations of the vehicle 12. The portions of the image data identified in the scene captured by the imaging system 60 may be configured to process the image data to optimize the detection of the coupler 16 relative to a ground plane 30. Accordingly, the system 10 may be configured to identify the coupler position 24 of the coupler in the image data to provide a robust approximation of the location in a variety of diverse situations that may create challenges.

As illustrated in FIG. 5, the trailer 18 is represented in a sterile environment comprising image data points that may be categorized in a plurality of data categories 100. The data categories 100 may be identified as trailer portions 100a and non-trailer portions 100b. As shown the non-trailer portions 100b in the image data captured by the imaging system 60 may comprise a horizon 102. The horizon 102 may be identified by the controller 14 to define a ground portion 104 and a sky portion 106. Additionally, the controller 14 may be configured to distinguish between portions of the image data that correspond to the trailer portions 100a and the non-trailer portions 100b.

Each of the trailer portions 100a and non-trailer portions 100b may further be categorized by the controller 14 into additional categories (e.g. a coupler portion 112 of the trailer portion 100a). As discussed herein, the data categories 100 (e.g. 102, 104, 106, etc.) may correspond to pixels and/or groups of pixels of the image data, which may be identified and categorized based on various image processing filters (e.g. Sobel mask, Poewitz mask) and/or feature extraction techniques (e.g. feature extraction, edge linking, Hough transform). In this way, the controller 14 may be configured to identify various portions of the image data and categorize the portions into a variety of categories, which may provide for robust detection of the coupler position 24 to accurately navigate the hitch 22 to the coupler 16.

Referring to FIGS. 6A, 6B, 6C, and 6D, drawings of sample image data demonstrating a plurality of trailer types 110 are shown illustrating a plurality of noise factors that may affect the operation of the system 10. Similar to the example in reference to FIG. 5, the image samples demonstrated in FIG. 6 may include image data comprising the trailer data 100a and the non-trailer data 100b. For example, the non-trailer data 100b may be represented in one or more of the image samples as the horizon 102, one or more ground portions 104, and/or sky portions 106. Additionally, the trailer data 100a may comprise one or more of a coupler portion 112, a tongue portion 114, a body or frame portion 116, and/or a wheel portion 118. Accordingly, by categorizing the image data into the image data categories 100, the system 10 may provide for the detection of the coupler position 24 at a high level of accuracy.

The accuracy of tracking the portions or tracked points associated with the data categories 100 may be achieved by categorizing and tracking the image data as reference points in a sequence of image frames captured by the imaging system 60. The reference points may further be tracked based on the motion of the vehicle 12 to verify that the changes in the scene captured by the imaging system 60. For example, by monitoring the motion of the vehicle 12 via the speed sensor 38, the yaw rate sensor 40, and/or the proximity sensor 42, the controller 14 may be capable of correlating the movements of the tracked points in the image data to the motion of the vehicle 12. In this way, the system 10 may maintain the identification and detection of the coupler position 24 and other portions of the image data with a high level of accuracy even when confronted by a variety of interference or noise factors that may be confronted in real world situations.

Some of the noise factors that may be confronted by the system 10 may include variations in the trailer types 110 targeted for connection to the hitch 22. As shown, each of FIGS. 6A, 6B, 6C, and 6D demonstrate a first trailer type 110a, a second trailer type 110b, a third trailer type 110c, and a fourth trailer type 110d, respectively. Each of the trailer types 110 may comprise one or more variations in body style (e.g. a recreational vehicle, utility trailer, boat trailer, horse trailer, etc.), tongue style (e.g. iChannel, A-frame, custom, etc.), and/or various trailer coupler styles (e.g. straight channel flat mount, collar lock, brake actuator, A-frame, adjustable height, coupler locks, etc.). Additionally, each of the trailer types 110 and the underlying portions of the depicted trailers may comprise a variety of colors and/or surface finishes, which may create a wide range of variations in color and reflection of light depicted in the image data captured by the imaging system 60. By categorizing the image data into the various trailer portions 100a and non-trailer portions 100b, the controller 14 may provide for improved accuracy in the detection of the coupler position 24 by consistently tracking the various categories over the sequence of image frames captured by the imaging system 60. The categorization of the image data may allow the controller 14 to monitor the constituent portions of the image data in each of the image frames and compare the categorized portions to limit false detections of the coupler 16. For example, the false identifications may be limited by filtering transient variations that do not vary consistently with the identified image data categories 100 in the image data and the motion of the vehicle 12.

Additional noise factors that may impact the accuracy of the tracking of the coupler position 24 in the image data may include variations in lighting, weather-based visibility conditions, transient and/or static shadows, surface types, surface features, and various additional environmental properties captured in the image data. For example, as depicted in FIG. 6A, the ambient lighting conditions depicted correspond to a night or twilight condition; whereas, the lighting conditions illustrated in FIG. 6B demonstrate a bright sunlight condition. Additionally, as depicted in FIG. 6C, a wet pavement condition may result in various reflections 120, which may result in false identification of the coupler position 24 if not monitored in connection with the additional trailer portions 100a. Accordingly, by tracking the various portions of the image data by the image data categories 100, the system 10 may be configured to limit variations in the detection of the coupler position 24 to promote a highly accurate alignment between the hitch ball 22 and the coupler 16.

Still referring to FIGS. 6A-6D, the image data may further comprise variations in a relative heading angle of the trailer 18 and/or variations in the viewing angle of one or more of the cameras 60a-60d of the imaging system relative to the trailer 18. As demonstrated by comparing FIGS. 6B and 6D, the heading angle 122 of each of the trailers 18 may significantly vary in the image data. As demonstrated in FIG. 6B, a heading direction 122 of the trailer 18 is depicted aligned with a heading direction of the vehicle 12; whereas, the heading direction 122 of the trailer 18 depicted in FIG. 6D is depicted as having a heading angle that is significantly skewed or nearly perpendicular relative to the heading direction of the vehicle 12. Accordingly, the system 10 may further be configured to identify the heading direction 122 of the trailer 18 based on the trailer data 100a in order to improve the identification of the coupler position 24.

Additional factors may also affect the accuracy of the detection or the identification of the coupler position 24 in the image data as discussed herein. For example, a ride height of the cameras 60a-60d of the imaging system 60 or variations thereof may create challenges in the detection of the coupler 16. Similarly, a bank angle of the vehicle 12 and/or the trailer 18 may result in the image data being skewed such that the relationship of the coupler 16 to the hitch ball 22 may similarly be skewed in the image data. Finally, nearby objects, pedestrians, whether transient or static, as well as adjacent trailers 124 may also correspond to noise factors that may affect the detection of the coupler 16 in the image data. Accordingly, by categorizing the image data in the categories 100, the system 10 may be operable to track a relative relationship of each of the data points identified in the image data categories 100 to account for the variations in relationships, surface features, angles, and/or interruptions in the form of various objects that may be identified and/or filtered from the detection of potential portions of the image data that may correspond to the trailer 18 and, more particularly, to the coupler 16 (e.g. the trailer portions 100*a*).

Figure 7:
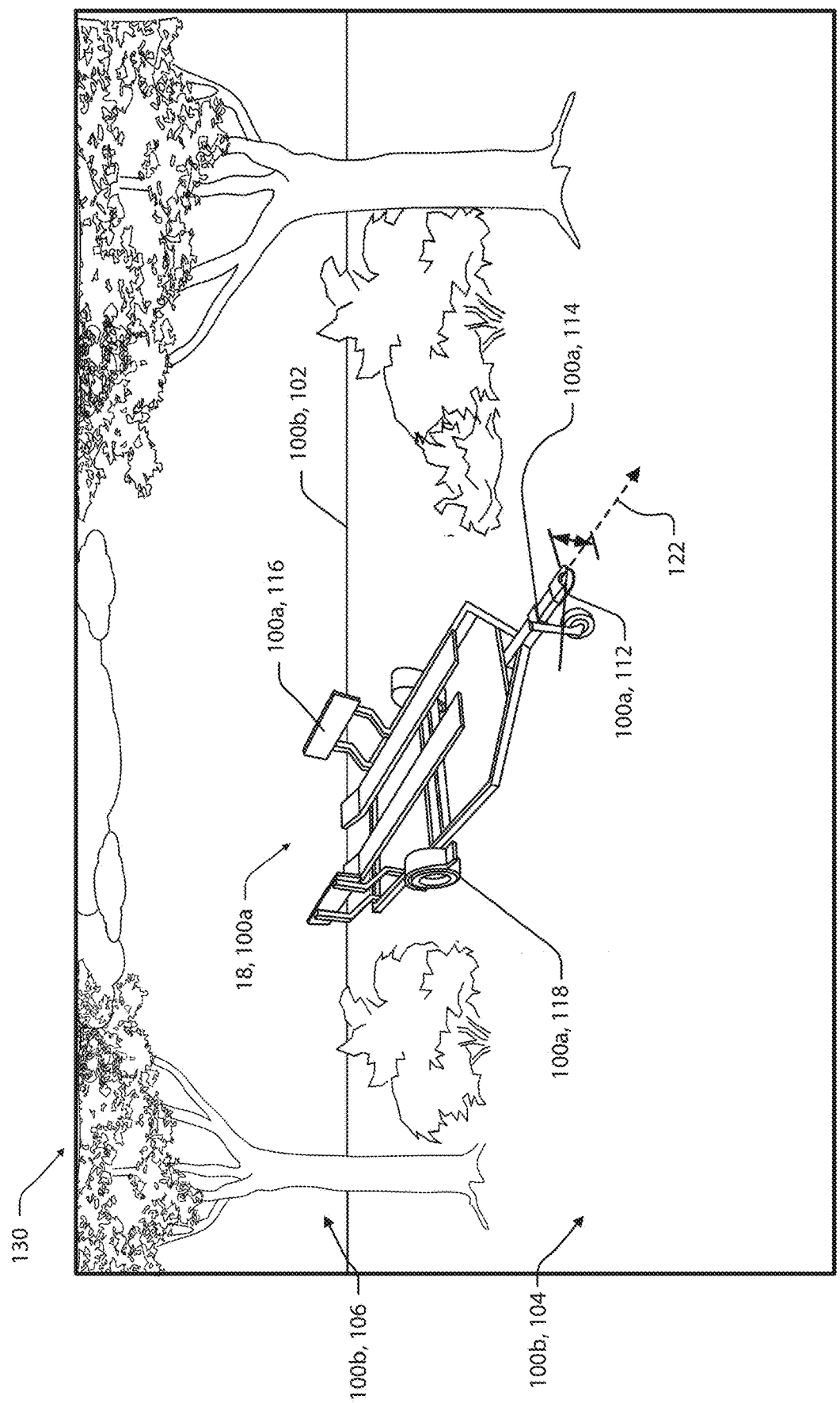
FIG. 7a is a projected view of image data demonstrating a trailer.

Referring now to FIG. 7, an exemplary depiction of the trailer 18 is shown in a scene comprising a plurality of noise factors as discussed herein. In operation, the controller 14 may receive image data comprising a plurality of consecutive image frames captured by one or more of the cameras 60*a*-60*d* of the imaging system 60. As depicted in FIG. 7, an exemplary image frame 130 of an exemplary sequence of image frames is shown demonstrating the trailer data 100*a* and the non-trailer data 100*b* as categorized by the imaging processing routine 86. For example, the controller 14 may be configured to track the horizon 102, the ground portion 104, and/or the sky portion 106 as depicted in the image frame 130 over a plurality of image frames captured by the imaging system 60. Similarly, the system 10 may be configured to track the coupler portion 112, the tongue portion 114, the body or frame portion 116, the wheel portion 118, and/or various portions of the trailer 18, which may be categorized in the trailer data 100*a* over the sequence of images captured by the imaging system 60. Based on the tracking of the image categories in the image data, the system 10 may be configured to accurately detect a location of various portions of the trailer 18 to ensure that the coupler 16 and heading direction 122 may be accurately identified for navigation of the vehicle 12.

In an exemplary implementation, the controller 14 may classify portions the image data into the various image data categories 100 in response to the coupler distance $D_c$ being less than or equal to a predetermined distance of the coupler 16. Accordingly, during an initial navigation of the vehicle 12 toward the coupler 16, the system 10 may approximate the location of the coupler position 24 via a pattern recognition method (e.g. a trailer pattern detection filter), which may generally locate the coupler 16 within the image data from a distance exceeding the predetermined distance. Once the coupler distance $D_c$ is within the predetermined distance, the system 10 may categorize the image data into the image data categories 100 as discussed herein. The predetermined distance may vary depending on the application, resolution, and performance of the imaging system 60. However, the predetermined distance may correspond to a distance from the coupler position 24 to the hitch position 26 ranging from approximately 1 meter to 5 meters in distance.

As previously discussed, the system 10 may classify the image data into the ground portion 104, the coupler portion 112, and the tongue portion 114. Based on the ground portion 104 and the horizon 102, the controller 14 may identify the ground plane 30 of the ground portion 104 and compare the ground plane 30 to a height of the coupler portion 112 and the tongue portion 114 of the trailer 18. Based on the comparison of the ground plane 30 to the coupler portion 112 and the tongue portion 114, the controller 14 may identify the height $H_c$ of the coupler 16 in the image data. Similarly, based on the coupler portion 112 in connection with the tongue portion 114, the controller 14 may identify the heading direction 122 of the trailer 18. In an exemplary embodiment, the controller 14 may further apply one or more feature extraction operations or image-filtering operations (e.g. a Hough transform and/or Kalman filter) to determine a center point of a coupler position 24 in the image data. In this way, the system 10 may utilize the image data captured by the imaging system 60 to accurately identify the coupler position 24 and/or the heading direction 122 of the trailer 18.

Figure 8:
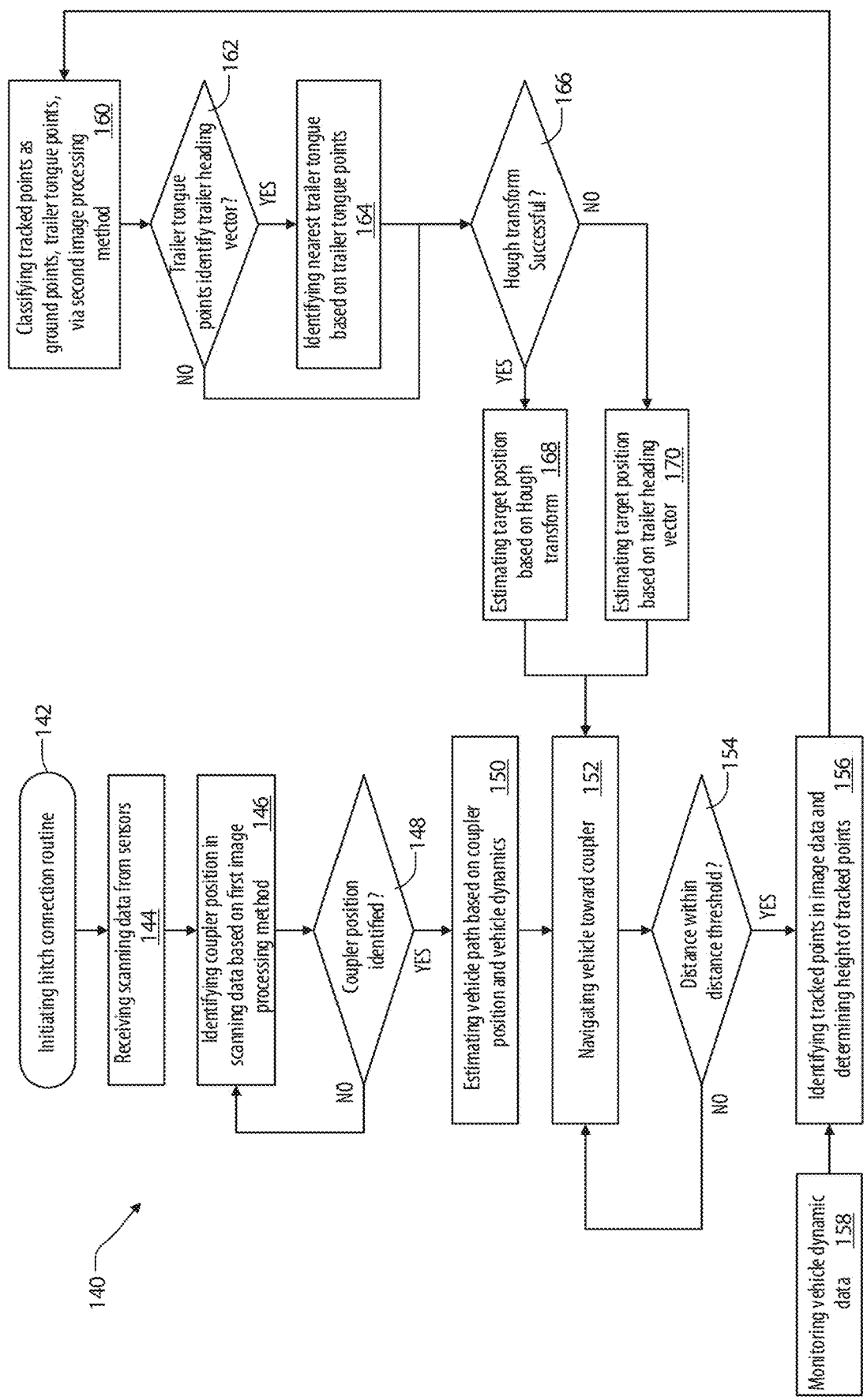
FIG. 8 is a flow chart demonstrating a method for detecting a trailer in image data in accordance with the disclosure.

Referring now to FIG. 8, a flowchart is shown demonstrating a method 140 for maneuvering the vehicle 12 such that the hitch ball 22 is aligned with the coupler 16. The method 140 may begin by initiating a hitch connection routine with the controller 14 (142). The hitch connection routine may begin by scanning data from various sensors of the vehicle 12 (e.g. the cameras 60*a*-60*d* of the imaging system 60) (144). In step 146, the controller 14 may identify the coupler position 24 in the image data based on a first image processing method. The first image processing method may correspond to a pattern recognition or trailer pattern recognition processing method that may approximate the coupler position 24 in the image data. The pattern recognition algorithm associated with the processing method may compare the image data to a variety of shapes corresponding to the various trailer types 110 at a range of heading angles relative to the vehicle 12. In this way, the controller 14 may initially approximate the coupler position 24 in the image data from distances that exceed a predetermined distance (e.g. distances greater than 1 to 5 meters).

The method 140 may continue in step 148 to determine if the coupler position 24 is identified in step 146. If the coupler position is not identified, the controller 14 may continue to scan the image data to identify the coupler position 24 in step 146. If the coupler position 24 is identified, the method 140 may continue to step 150. In step 150, the controller 14 may estimate the vehicle path 20 based on the coupler position 24 and the vehicle dynamics via the path derivation routine 88.

Once the path derivation routine 88 identifies the vehicle path 20, the controller 14 may continue by navigating the vehicle 12 toward the coupler position 24 (152). While navigating the vehicle 12 to the coupler 16, the controller 14 may monitor the coupler distance $D_c$ to determine if the coupler 16 is within the predetermined distance threshold (154). If the coupler distance $D_c$ is within the predetermined distance threshold, the method 140 may continue to step 156. In step 156, the controller 14 may identify the various portions of the image data and categorize various tracked portions of the image data into the image data categories 100, as discussed herein.

In order to successfully monitor the tracked points or portions of the image data in the data categories 100 in step 156, the controller 14 may also monitor the vehicle dynamic data to determine the relative motion of each portion or point in the image data over time (158). For example, in operation, the system 10 may monitor the speed sensor 38, the yaw rate sensor 40, and/or the proximity sensor 42 to project the movement of the tracked data points in the image data based on the motion of the vehicle 12. In this way, the system 10 may compare the relative motion of the portions or tracked points of the image data in the image data categories 100 over time. In particular, the controller 14 may compare the amount of motion indicated in the dynamic data in step 158 to the changes in the coordinates of the tracked portions or points in the image data categories 100. Based on the motion of the vehicle 12, the controller 14 may determine a corresponding change in the location of each of the portions or tracked points in the pixel space depicting the data categories 100.

Finally, in some implementations, the controller 14 may monitor the motion data of the vehicle 12 to identify a scale of the pixels in the image data captured by the camera system 60. Based on the relative motion of the pixels, the controller 14 may further determine a height of the tracked points or portions (e.g. the coupler portions 112 and/or the tongue portions 114) relative to the ground portion 104 to identify a height of the coupler portion 112 and/or the tongue portion 114. In this way, the system 10 may accurately detect the relative motion of each of the tracked points in the image data over the plurality of image frames based on the relative motion of the vehicle 12. Additionally, the motion of the vehicle 12 corresponding to the movement of the pixel data may be utilized to improve the accuracy or determine the height of the coupler portion 112 and the tongue portion 114.

As previously discussed, the image data categories 100 may comprise the trailer data 100a and the non-trailer data 100b. In step 160, the method 140 may continue to track the coupler portions 112, the tongue portions 114, and various other portions of the trailer 18 (e.g. frame portions 116, wheel portions 118) relative to the ground plane 30 or ground portions 104. Additionally, the controller 14 may track a variety of uncategorized portions of the image data that may be proximate the trailer 18 in the pixel data. The controller 14 may categorize each of a plurality of data points categorized as trailer portions 100a relative to the ground portions 104 as trailer tongue portions 114. The non-categorized portions may not correspond to or meet any of the criteria for the portions discussed herein. As such, the non-categorized portions may not be included in the analysis for the determination of the coupler position 24 and may be disregarded.

Once the tongue portions 114, which may comprise the coupler portions 112 are identified by the controller 14, a dataset of trailer tongue points may be identified in the form of a point cloud of pixels of the image data. These trailer tongue points may be evaluated by the controller 14 to determine a heading vector along the orientation of the heading direction 122 of the trailer 18 (162). The heading direction 122 of the trailer 18 may then be compared to a heading direction of the vehicle 12 to identify the relative trailer heading angle therebetween. Further, the trailer tongue points of the tongue portions 114 may be filtered in step 164 to determine the trailer tongue points that are closest to the vehicle 12 or result in a minimum coupler distance $D_c$. Based on the heading direction 122 and the minimum coupler distance $D_c$, the system 10 may identify an accurate approximation of the coupler position 24 based on the image data.

In step 166, the controller 14 may continue to apply a feature extraction operation (e.g. a Hough transform) based on the nearest trailer tongue points identified in step 164 (166). If the Hough transform in step 166 is successful, the controller 14 may estimate the coupler position 24 in the image data based on the Hough transform (168). The determination of the success of the Hough transform may be based on a determination of a degree of certainty or confidence level associated with the calculation. That is, if the Hough transform is accomplished with a degree of certainty exceeding a minimum confidence level, the calculation may be determined to be successful in step 168. If the Hough transform is unsuccessful in step 166, the controller 14 may continue by estimating the target position of the coupler position based on the heading direction 122 of the trailer or trailer heading vector as discussed based on the minimum coupler distance $D_c$ (170). Once the coupler position is identified in steps 168 or 170, the method may continue to step 152 to control the navigation of the vehicle 12 toward the coupler position 24.

In addition to the steps shown in FIG. 8, the method 140 may further be configured to apply additional identification routines to identify the coupler position 24 in the image data. For example, in response to the coupler distance $D_c$ being less than a second predetermined threshold (e.g. $D_c$<1 m), the controller 14 may apply yet another identification algorithm to determine the coupler position 24. As discussed herein, the second predetermined distance may be less than the first predetermined distance discussed in reference to step 154. Once within the second predetermined distance, the controller 14 may identify the coupler position 24 based on a pixel tracking technique, which may identify specific pixels in the image data that correspond to the coupler 16 in order to identify the coupler position 24. In this way, the system 10 may utilize a variety of image processing algorithms at different distances to optimize the performance and accuracy of the determination of the coupler position 24 based on the image data.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle maneuvering control system, comprising:
at least one image device configured to capture image data; and
a controller configured to:
identify a coupler position of a trailer in the image data;
control motion of the vehicle navigating a hitch of the vehicle toward the coupler position;
monitor a coupler distance extending from the coupler position to the hitch; and
in response to the coupler distance being less than or equal to a distance threshold:
classify a plurality of portions of the image data as trailer portions and non-trailer portions;
identify a trailer heading direction based on the trailer portions;
filter a plurality of the trailer portions of the image data to determine a plurality of nearest trailer portions from the trailer portions, wherein the nearest portions are filtered based on a minimum distance between the trailer portions as detected in the image data and the hitch;
identify the coupler position by processing the image data via a feature extraction operation, wherein the feature extraction operation processes the nearest trailer portions to identify the coupler position; and
in response to the feature extraction operation detecting the coupler position with a predetermined confidence level, control the navigation of the vehicle to the coupler position identified based on the feature extraction operation.

2. The system according to claim 1, wherein the controller is further configured to:
in response to the feature extraction operation failing to achieve the predetermined confidence level, detect the coupler position, based on the trailer heading direction and the trailer portions nearest the vehicle.

3. The system according to claim 1, wherein the coupler position is approximated when beyond the distance threshold by processing the image data via a trailer pattern processing method.

4. The system according to claim 1, wherein the coupler position is detected via the feature extraction operation in the form of a Hough transform in response to the coupler position within the distance threshold.

5. The system according to claim 1, wherein the nearest trailer portions are filtered by a Kalman filter.

6. The system according to claim 1, wherein the non-trailer portions are further classified as ground portions and object portions.

7. The system according to claim 6, wherein the object portions are tracked in relation to a ground plane identified based on the ground portions.

8. The system according to claim 6, wherein the trailer portions are classified as trailer tongue portions, and wherein the controller is further configured to:
receive motion data for the vehicle via at least one motion sensor; and
track the tongue portions relative to the ground plane based on the motion data.

9. The system according to claim 1, wherein the classification of the plurality of portions of the image data is processed by comparing pixel values in image data to identify a plurality of edges corresponding to objects.

10. A method for controlling an alignment between a hitch of a vehicle and a coupler of a trailer comprising:
identifying a coupler position of the coupler in image data;
controlling a motion of the vehicle navigating the hitch of the vehicle toward the coupler position;
monitoring a coupler distance between the coupler position and the hitch to a distance threshold; and
in response to the coupler distance being less than or equal to the distance threshold:
classifying a plurality of pixels of the image data as trailer pixels and non-trailer pixels;
identifying a trailer heading direction based on the trailer pixels;
filtering the trailer pixels of the image data to determine a plurality of nearest trailer portions from the trailer pixels, wherein the nearest trailer portions are filtered based on a minimum distance between the trailer pixels as detected in the image data and the hitch,
identifying the coupler position of the coupler via a feature extraction operation, wherein the feature extraction operation processes the nearest trailer portions to identify the coupled position; and
in response to the feature extraction operation detecting the coupler position at a predetermined confidence level, navigating to the coupler position identified based on the feature extraction operation.

11. The method according to claim 10, wherein in response to the feature extraction operation failing to achieve the predetermined confidence level, detecting the coupler position, based on the trailer heading direction and the trailer pixels nearest the vehicle.

12. The method according to claim 10, wherein the coupler position is first approximated by processing the image data via a trailer pattern processing method.

13. The method according to claim 10, wherein the coupler position is detected via the feature extraction operation in the form of a Hough transform.

14. The method according to claim 10, wherein the nearest trailer portions are filtered by a Kalman filter.

15. A control system for vehicle navigation comprising:
a controller in communication with at least one imaging device configured to capture image data, wherein the controller is configured to:
monitor a coupler distance between a hitch of the vehicle and a coupler of a trailer; and
in response to the coupler distance being less than or equal to a distance threshold:
classify a plurality of portions of the image data as trailer portions and non-trailer portions;
identify a trailer heading direction based on the trailer portions;
process the image data via a Kalman filter identifying a plurality of nearest trailer portions from the trailer portions, wherein the nearest portions are identified based on a nearest distance between the trailer portions as detected in the image data and the hitch;
identify the coupler position via a Hough transform, wherein the Hough transition processes the nearest trailer portions to identify the coupler position;
in response to detecting the coupler position via the Hough transform at a predetermined confidence level, control a navigation to the coupler position identified via the Hough transform; and in response to the Hough transform failing to achieve the predetermined confidence level, detect the coupler position, based on the heading direction and the trailer portions nearest the vehicle.

16. The system according to claim 15, wherein the coupler distance is first approximated by processing the image data via a trailer pattern processing method when the vehicle is outside the distance threshold.

* * * * *

UNITED STATES PATENT AND TRADEMARK OFFICE
CERTIFICATE OF CORRECTION

PATENT NO. : 10,744,943 B1  
APPLICATION NO. : 16/377388  
DATED : August 18, 2020  
INVENTOR(S) : Jales Costa et al.

Page 1 of 1

It is certified that error appears in the above-identified patent and that said Letters Patent is hereby corrected as shown below:

In the Claims

Column 18;  
Claim 10, Line 20:  
"hitch," should be --hitch;--.  
Claim 10, Line 24:  
"coupled position" should be --coupler position--.  
Claim 15, Line 62:  
"transition" should be --transform--.

Signed and Sealed this  
Tenth Day of November, 2020

Andrei Iancu  
*Director of the United States Patent and Trademark Office*